United States Patent Office 2,701,763
Patented Feb. 8, 1955

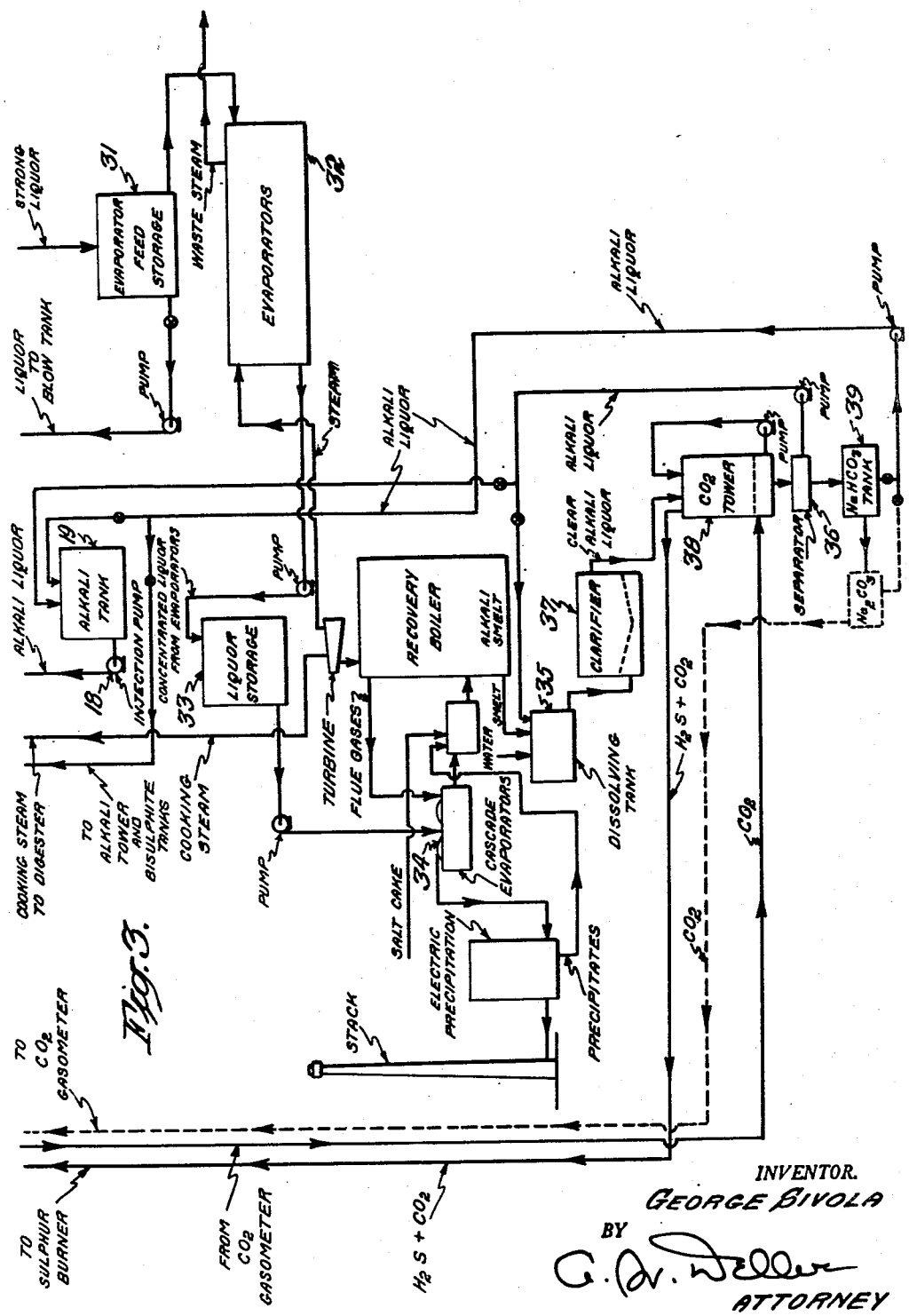

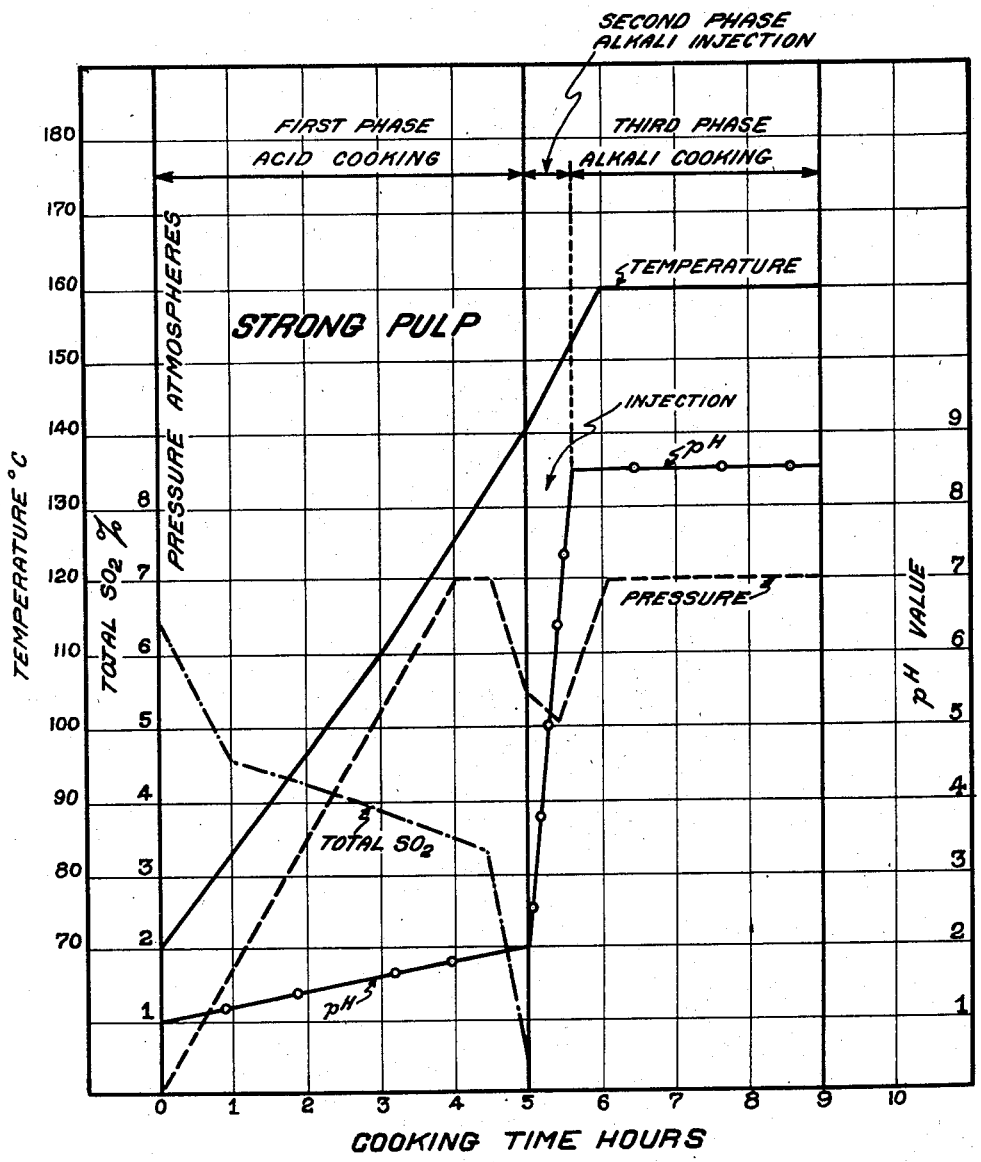

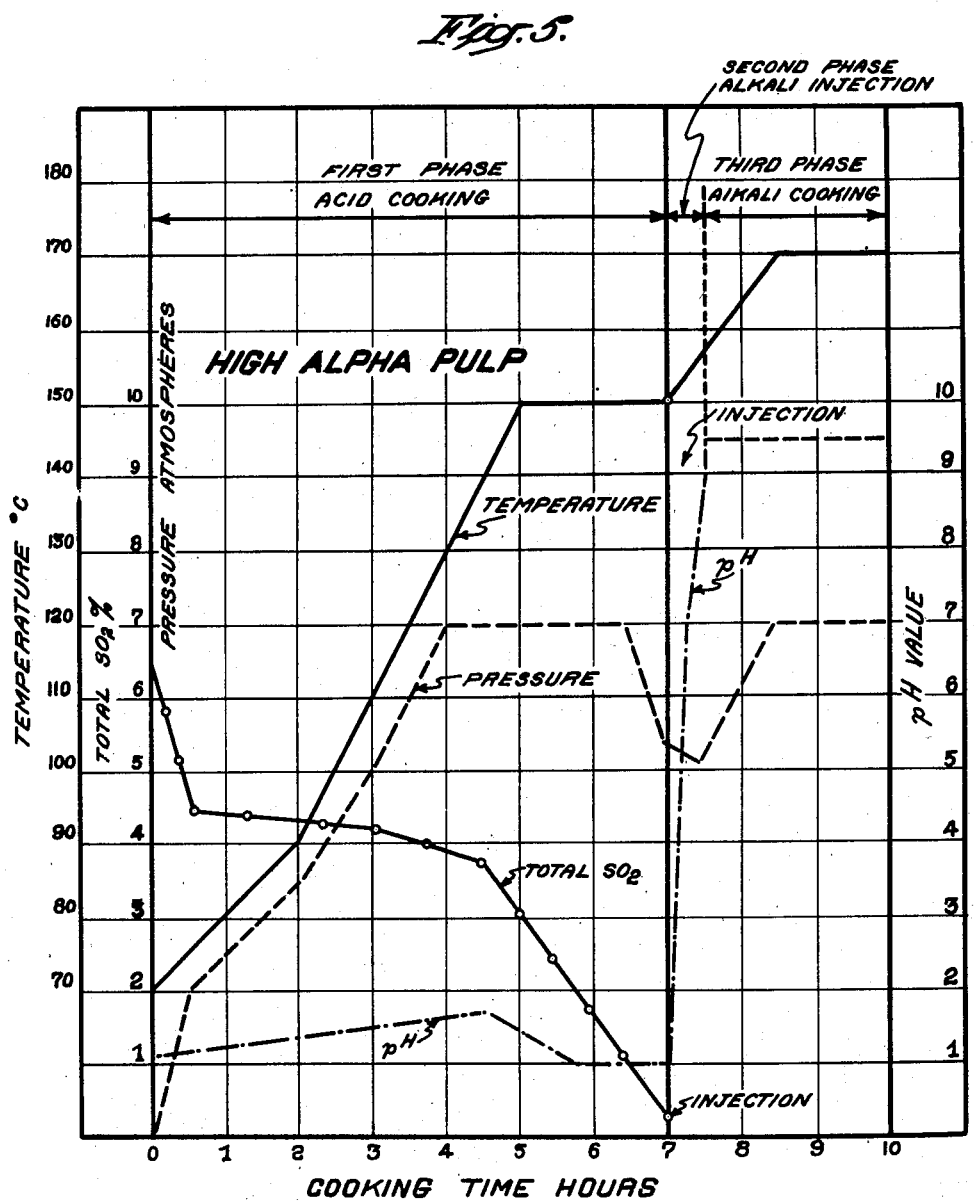

2,701,763

PROCESS OF MANUFACTURING PULP FROM CELLULOSIC FIBROUS MATERIALS

George Sivola, Tainionkoski, Finland

Application November 6, 1947, Serial No. 784,322

9 Claims. (Cl. 92—13)

The present invention relates to the art of producing pulp from cellulose fibrous materials, and, more particularly, to a process of manufacturing pulp from wood and the like involving a novel combination of a three phase acid-alkali cooking operation including alkali injection.

Heretofore, it has been well known that the conventional pulp-making processes ordinarily used in industrial operations for the commercial manufacture of pulp were (1) the sulfite process, (2) the soda process, and (3) the sulfate process. In the sulfite process, the cooking liquor was an acid solution containing sulfur dioxide or sulfurous acid and calcium bi-sulfite whereas in the soda and sulfate processes, the cooking liquor was an alkaline solution. Usually the cooking liquor in the soda process was caustic soda and in the sulfate process was caustic soda and sodium sulfide. Each of these processes has advantages but also has disadvantages. Thus, one of the main disadvantages of the sulfite process has been the problem of disposing of residual cooking liquor. It has been the common practice to dispose of the residual liquor into nearby streams or bodies of water. This practice has resulted in a serious pollution of the water. In many states, laws have been enacted prohibiting the pollution of streams, lakes, etc. Although an enormous amount of work has been done on this problem, no solution has as yet been found. Thus, it is stated in the book entitled "Cellulose and Cellulose Derivatives" by Emil Ott that "the sulfite process has certain disadvantages, such as the less satisfactory cleanness of the pulp, which necessitates careful sorting of the wood; moreover, it is impossible to recover the spent liquors completely. Accordingly, the reproach has been brought against the sulfite process in increasing measure that it compares unfavorably with the sulfate cook as regards the disposal of waste liquor. If the waste liquor is not burned (a problem which has not been satisfactorily solved from the economic side), stream contamination results, and recently built plants have experienced all sorts of troubles because of this question. Moreover, when beechwood is cooked, alcohol cannot be recovered from the waste liquor as the pentoses formed from the pentosans yield no alcohol on fermentation. To be sure, recent studies which use the yeast *Torula utilis* for the production of fodder yeast from waste sulfite liquors suggest a new possibility, but this does not alter the total picture of waste liquor disposal, as the problem of the quantitative utilization of lignin sulfonic acids in the waste liquor still awaits a solution. The possibilty of the production of tannins and vanillin is still too slight to have any effect. The greater part still goes into the river." Other disadvantages of the sulfite process are that the pulp produced has lower strength characteristics than a sulfate pulp, has a high pitch content, and has a low alpha content of 88–91% and a high pentosan content. Therefore if a dissolving pulp having an alpha content 96% or more is wanted, the pulp has to be treated with alkali in special equipment either cold or hot. This treatment is expensive as it requires a lot of chemicals, heat, and equipment; also a part of the pulp is dissolved. Furthermore, only limited species of wood can be used.

Then, again, it is stated in Ott's book "Cellulose and Cellulose Derivatives" that "disadvantages of alkaline digestion are the darker color of the pulp and the difficulty of obtaining a satisfactory bleach. In general, sulfate pulp is not only richer in lignin than sulfite pulp but is also especially hard to bleach—probably because of the formation of sulfur-containing coloring matters. Accordingly, bleaching processes have been developed abroad which give a satisfactory white content in from five to seven steps. However, according to samples at our disposal, the white content is not so high as that of bleached sulfite pulp and has a maximum value of 85%, while good rayon sulfite pulps have a white content of 92% as compared with baryte white." The soda and sulfate processes likewise have other disadvantages. For instance, soda pulp has low strength characteristics and very limited uses. The dark colors limits the use of a sulfate pulp to a certain extent. Sulfate pulp likewise has a high ash content and has a low alpha content of 88–91% and a high pentosan content. Therefore, this pulp is not suitable for dissolving purposes. When a pulp having an alpha content of 94% or more is to be made, the chips have to be first pre-hydrolyzed with a weak acid, etc., in a special and separate vessel, removed from the vessel into the digester, and cooked by the conventional sulfate process. This is an expensive operation and so far very few commercial sulfates mills have done it. Although many attempts have been made to solve the problems confronting the art and to overcome the aforesaid disadvantages, none as far as is known has been wholly successful and satisfactory when conducted on an industrial scale for commercial production. Some of the attempts have been described by R. S. Hatch in his article entitled, "A comparison of the possible bases which may be used for sulphite pulping and the economics of recovery," which was published in the August issue (1946) of Pulp and Paper Magazine of Canada (pages 80 to 84). Others have been discussed in the book entitled "Cellulose and Cellulose Derivatives" by Emil Ott, particularly on pages 479 to 518 (published in 1943 by Interscience Publishers, Inc.).

It has been discovered that disadvantages of the sulfite and alkali processes can be overcome while at the same time retaining their advantages.

The present invention has an object to provide a unique process of manufacturing pulp from cellulose fibrous material involving a novel combination three phase acid-alkali cooking operation including alkali injection.

It is also an object of the invention to provide a novel combination three phase acid-alkali process involving injection alkali capable of producing pulp which has desired chemical characteristics, such as high alpha content, and which has strength characteristics just as good as or better than conventional sulfate pulp.

Another object of the invention is to provide a new process of manufacturing pulp by using a three phase acid-alkali cooking operation involving injection alkali which is capable of producing pulp which is as white as ordinary calcium base sulfite pulp, which has low pitch content and which is easily bleached.

Furthermore, it is within the contemplation of the invention to provide a novel three phase acid-alkali process involving injection alkali and involving a self-supporting cyclic operation of recovering chemicals and heat by substantially complete utilization of residual cooking liquor and recovering of pulping agents in a form permitting their economical reuse in the pulping process.

Moreover, the present invention contemplates the provision of a combination three phase acid-alkali cooking process capable of being controlled, of permitting the pulp maker to predetermine what kind of a pulp he desires to produce, and of cooking a different species of woods which cannot be cooked by the conventional sulfite process.

Other objects and advantages will become apparent from the following description taken in conjunction with the accompanying drawings, in which:

Fig. 3 illustrates a flow sheet of the alkali operations involved in the novel process depicted in Fig. 1; and Figs. 4 and 5 are charts showing the relation of temperature, pressure, pH, and $SO_2$ concentration versus time involved in the acid and alkali operations of the present process when producing two different kinds of pulp.

Figure 1:
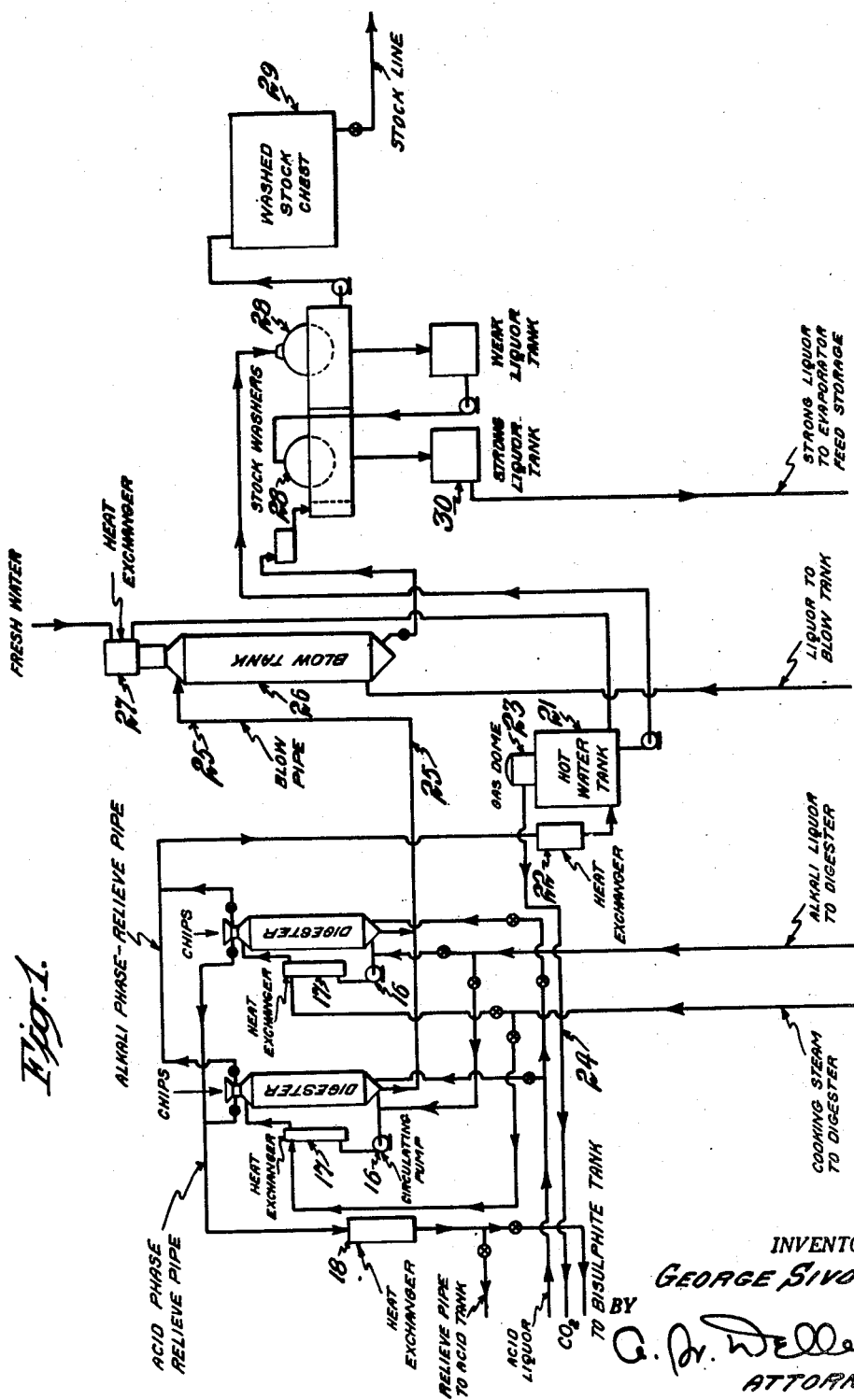
Fig. 1 is a flow sheet of the novel acid-alkali process of manufacturing pulp embodying the present invention.

Broadly stated, the present invention provides a novel process of making pulp in which the first phase of cooking is conducted with acid liquor to produce incompletely digested pulp and in which in the second phase the acid cooking liquor is converted to alkali liquor by injecting alkali into the digester, and in which the third phase is conducted with alkali liquor to complete the digesting of pulp while at the same time the three phases have self-supporting cyclic systems for the recovery of chemicals and heat. In this manner, the individual fibers can be separated from each other with a minimum of mechanical damage and the separated fibers can be purified chemically to comply with the specifications established for the pulp product. With the unique three phase process, it is possible, for instance, to produce pulp of high purity and of high alpha content of the order of 96 or 98% or higher which can be used for the manufacture of cellulose derivatives. In contrast therewith, the conventional sulfite or alkali processes can only produce low purity and low alpha pulps of the order of 88% to 91%.

In carrying the present invention into practice, wood is first cooked with an acid liquor, to wit: a bisulfite solution at a pH range (0.75-2.25) which is favorable to introducing acid group into a lignin carbohydrate complex forming an insoluble compound which at a higher temperature is hydrolyzed into ligno-sulfonic acid and carbohydrates and at the same time less resistant hemicelluloses are hydrolyzed to simple compounds, producing a partly digested pulp. The formation of lignosulfonic acid continues until the cooking is finished, thus full use is made of the acid group introduced into the complex. After completing the first phase, alkali is injected into the digester and the partly digested pulp is treated with an alkali liquor at a pH range (7-10.5) favorable to forming an alkali soluble lignin derivative which is in the cooking liquor in the form of sodium salt of ligno-sulfonic acid. During the acid treatment, hydrolysis of lignin and hemi-celluloses take place and during the alkali phase treatment the ligno-sulfonic acid thusformed is neutralized while some hemicellulose and noncellulosic material soluble in alkali are dissolved.

By adjusting the temperature, time cycle, and the pH of the acid phase and the same factors of the alkali phase, any grade of pulp can be produced, such as an unbleached pulp having an alpha content of 96-98%. The following rules must be observed in carrying the present invention into practice for the production of a strong paper pulp:

1. Chips like those used in the conventional pulpmaking processes are used.
2. The acid liquor comprises sodium, potassium or ammonium bisulfite with an excess of sulfur dioxide. The content of sulfur dioxide is as follows:

|  | Per cent |
|---|---|
| Total $SO_2$ | 5-10 |
| Combined $SO_2$ | 0.5-1.5 |
| Free $SO_2$ | 4.25-8.5 |

3. A cooking pressure of about 5-10 kg. per sq. cm. (75 to 150 lbs. per sq. in.) is employed.
4. In the cooking operation of the acid phase, penetration time or the time to raise the temperature to 110° C. is about three hours or more. The pulp is partly digested and the sulfur dioxide is reduced to less than 1% and usually about 0.2% to about 0.5%.
5. When a temperature, for example, of about 120° C. with a range of about 100° C. to about 155° C. is reached in, for example, about three hours, within a range of about two and one-half hours to about seven hours, alkali liquor is injected into the digester.
6. The alkali liquor, for example, has the following composition:

|  | Range, per cent |
|---|---|
| $NaHCO_3$ | 10-60 |
| $Na_2CO_3$ | 60-25 |
| $Na_2S$ | 10-2 |
| $Na_2SO_4$ | 10-3 |
| Others | Balance |

7. The second phase involving the alkali injection usually takes about ⅙ hour to ½ hour, the temperature is maintained at about 120° C. to about 155° C. and the pH is changed from a range preferably of about 0.75 to about 2.5 or 3 to a range preferably of about 7.0 to about 10.5. During the second phase, the ligno-sulfonic and other organic acids are neutralized. The free $SO_2$ left in the cooking liquor reacts with the alkali forming mainly sodium monosulfite ($Na_2SO_3$).

8. The third phase involving alkali cooking usually takes about 2½ hours to about 5 hours, the temperature is maintained at about 150° C. to about 180° C. and the pH is controlled within a range of about 7.0 to about 10.5.

After the penetration time, the temperature of the acid cooking liquor is raised at a rate of 15° C. per hour. When a quickly hydrating pulp having a particularly high bursting strength is wanted, the acid phase of the cooking is ended at 130° C. by injection of alkali into the digester so that the pH value of the alkali is about 8-8.5 after the injection. The temperature is raised quickly to 150-155° C. and kept in this temperature range until the cooking is finished. This type of a pulp has an alpha content 91-92%. When a slower hydrating pulp having particularly high tearing strength is desired, the injection takes place at 140° C.

After the injection, the cooking takes place as indicated hereinbefore. In this case, the hydrolyzing effect of the ligno-sulfonic acid is longer than in the aforesaid case, but not long enough to cause any damage in the fibres. Pulp produced has an alpha content of 92.5-93.5% which means the pulp is more purified than the aforesaid pulp and has the strength characteristics desired.

When a high alpha pulp is wanted, the chips and acid are the same as before. After allowing three hours or more for the peneration, the temperature of the acid-cooking liquor is raised quickly to 150-155° C. before the injection takes place. By so doing, more time is allowed for the hydrolysis of the ligno-sulfonic acid in the fibres. The pH value of the cooking liquor drops to 0.75-1.2. Depending upon the alpha content wanted, the procedure is changed at will. If a pulp having an alpha content of 94-95 is wanted, the injection takes place when the temperature has reached 150° C. Enough alkali is injected to raise the pH of the cooking liquor to approximately 9.5 and kept at this pH value by injecting more of alakli into the digester, if necessary. The temperature is raised quickly to 165-180° C. and kept in this range until the cooking is finished.

When a pulp having an alpha content of 96-98% is wanted, a longer time for the hydrolysis of the lignosulfonic acid is allowed. The injection of alkali takes place about one hour after the temperature of the cooking liquor has risen to 150° C. after the pH value of the liquor drops to about 1.0, which means that more ligno-sulfonic acid is formed and more hemi-celluloses have broken down. After the injection, the pH value of the alkali solution is about 9.5 and is kept at that value. The temperature is raised quickly to 165-180° C. and kept in this range.

As shown heretofore, the chemical characteristics and strength factors of a pulp cooked by this process can be changed at will. The aforesaid rules can be modified and/or varied to some extent and still get about the same pulp.

Figure 2:
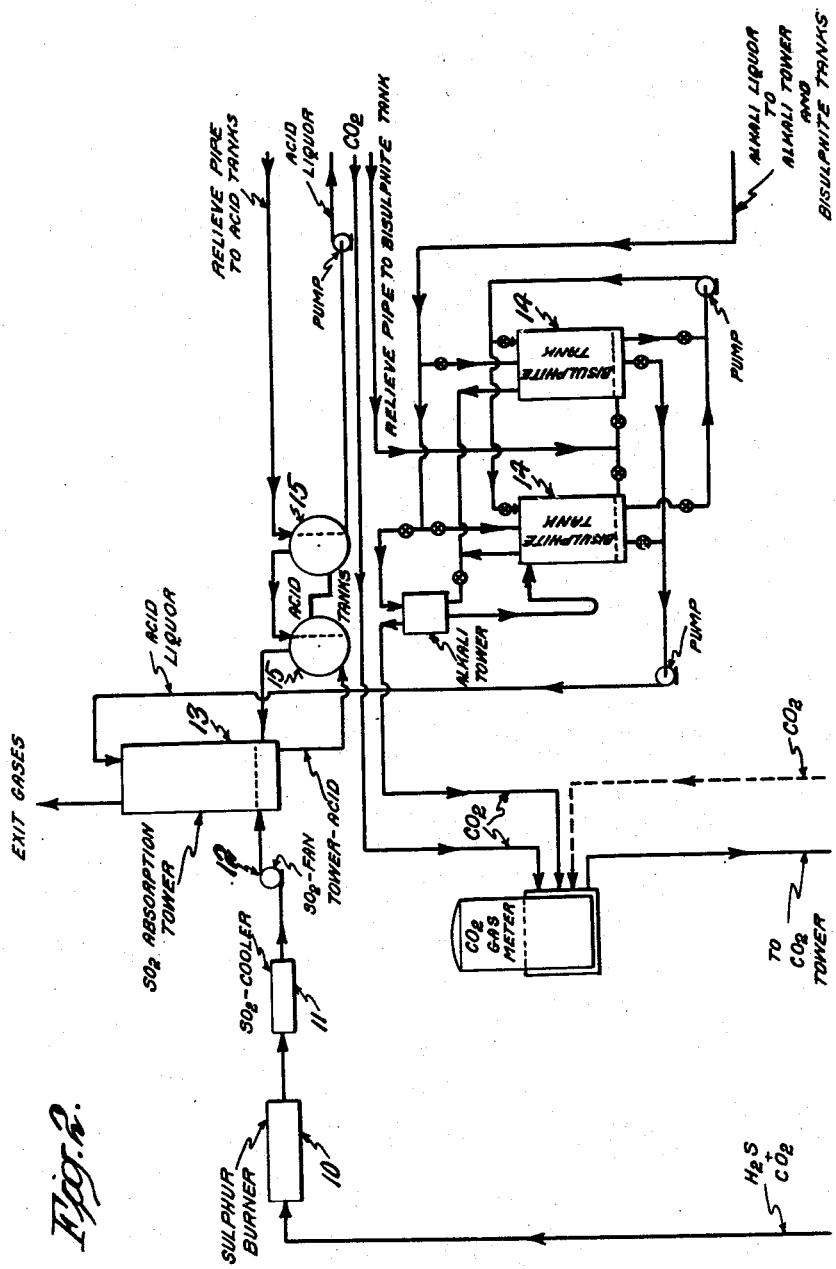
Fig. 2 shows a flow sheet of the acid operations involved in the novel process depicted in Fig. 1.

The present invention may be carried into practice in any appropriate equipment. Flow sheets depicting the new acid-alkali process involving alkali injection are illustrated in Figs. 1 to 3. Referring more particularly to the drawing, sulfurous acid is made by burning sulfur to $SO_2$ in an acid burner 10. The $SO_2$ gas is cooled in a $SO_2$ cooler 11 and after that blown by a $SO_2$ fan 12 into an absorption tower 13 where it is taken up by water and sodium bi-sulfite pumped from the bi-sulfite tanks 14. There are two of these tanks. Bi-sulfite is made in batches and pumped to the top of the absorption tower. From the absorption tower, the acid is pumped or runs by gravity into the acid tanks 15. To strengthen the cooking acid, $SO_2$ gas vented from the digesters during the acid cooking phase is blown into the last acid tank.

When the digester is filled with chips, acid is pumped into the digester. The valves are closed and the circulating pump 16 is started. The steam is turned on to the heat exchanger 17. When the pressure has risen to the chosen maximum limit the gases are relieved and cooled in heat exchangers 18, then at the beginning of the cook blown into the acid tank 15. After that, during the acid phase, the $SO_2$ is blown either into the bi-sulfite tanks or into the acid tank 15.

When the injection takes place, the alkali is pumped with injection pump 18 from the alkali tank 19 into the suction side of the circulating pump 16. During the alkali phase of the cooking the digester is relieved into the hot water tank 21 through a heat exchanger 22. On top of the hot water tank is a dome 23 to collect gases. From the dome there is a pipe line to the $CO_2$ gasometer 24. When the digester is ready, the pulp is blown through the blow pipe 25 into a blow tank 26. On top of the blow tank is a heat exchanger 27 in which the steam vapors relieved during the blow are condensed and the condensate goes in the hot water tank. From the blow tank, the pulp is pumped to stock washers 28 where the liquor is separated from the fibers. From the washers, the pulp is pumped to the washed stock chest 29. From the strong liquor tank 30, the waste cooking liquor goes into the evaporation feed storage 31. From that tank, some liquor is pumped into the blow tank to dilute the stock. The rest of the liquor goes into the evaporators 32 where it is evaporated to 50–60% total solid contents. From there, it goes into the liquor storage 33, and then to the cascade evaporators 34 where the liquor is evaporated to a solid content of 60–70%. This is done by putting the flue gases through the cascade evaporators. From these evaporators, the thick liquor goes into the recovery boiler where it is burned for the recovery of heat and chemicals. The flue gases after leaving the cascade evaporators go into an electrical gas filter where alkali and sulfur are recovered. The recovered chemicals are returned to the system where the salt cake is added. Finally the gases go into the stack. If salt cake is used to cover or compensate the alkali losses, it is added into the liquor before it is fed into the boiler. From the boiler, the smelt, mainly sodium carbonate and sodium sulfide, runs into the dissolving tank 35 where it is dissolved with the filtrate from the bicarbonate separator 36 or water. From there, the dissolved liquor goes into a clarifier 37 and then into a $CO_2$ tower 38. In this tower, sodium carbonate is converted to sodium bicarbonate and the sodium sulfide to sodium carbonate and hydrogen sulfide ($H_2S$). The liberated $H_2S$ is burned to $SO_2$ in the sulfur burner. The sodium bi-carbonate crystals formed by treating the clarified liquor with the $CO_2$ are separated and the filtrate of which is used either as a dissolving water in the dissolving tank or as injection alkali. This filtrate contains some sodium sulfide but does not do any harm in the cooking process, as there is no free sulfur formed due to the alkaline condition in the digester. From the separator, sodium bi-carbonate goes into the bi-carbonate tank 39. If salt cake is used to cover the sodium losses and if for some purpose soda ash is needed, for instance, for the bleaching purpose, soda ash can be readily made by driving off the $CO_2$ from the sodium bi-carbonate. When sodium hydrate or sodium carbonate or sodium bi-carbonate is used to make up sodium losses, they are added either into the bi-sulfite tanks or into the alkali tank.

If ammonia is used as a base for acid cooking liquor in this process as well as for the injection, the recovery of the ammonia is accomplished as follows: Waste liquor is first evaporated and after evaporation the ammonia is driven off by adding an equivalent amount of other alkalis, i. e., sodium or potassium hydrate, or under correct conditions magnesium oxide. The recovery of ammonia can be made from the digester by injecting, for instance, sodium salts of the types described heretofore. Sodium or potassium takes the place of ammonium in the cooking liquor and the latter can be gassed off and recovered. If ammonium is used as a base of the cooking liquor and for the injection and the residue evaporated to dryness, same can be used as a fertilizer provided the sulfur compounds in the residue are converted to sulfates by injecting air into the solution during the evaporation.

For the purpose of giving those skilled in the art a better understanding of the invention, the following illustrative examples will now be given.

EXAMPLE NO. 1

In the present example, spruce wood chips will be used as the raw material and a white pulp having a high strength, particularly a high tear strength, will be produced. The digesters are lined with acid resistant material or graphite bricks which are joined with acid and alkali resistant plastics. A unit for forced circulation is provided for each digester. The circulating pump associated with the forced circulation unit takes the liquor from the bottom of the digester and discharges it to the top thereof.

The acid liquor used has the following analysis:

|  | Per cent |
|---|---|
| Total $SO_2$ | 6.50 |
| Combined $SO_2$ | 1.25 |
| Free $SO_2$ | 5.25 |

When the spruce wood chips and acid are filled in the digester, the circulating pumps are started and steam is turned on. In the present process, sodium or potassium or ammonia base is used as the base in the acid sulfite cooking liquor and, consequently, the penetration time or the time to raise the temperature to 110° C. can be shortened in comparison with the time when calcium is used as a base in conventional processes. In this manner, the total cooking time is thus shortened. The best temperature chart for this kind of a pulp can be worked out beforehand by making a few test or trial cookings. The procedure to be used in making the charts is as follows:

1. Penetration time is taken to be three hours.
2. After the penetration time the temperature is raised 15° C. per hour.
3. As pulp having particularly good tear strength usually has a higher alpha content than ordinary pulp, such a pulp is preferred.
4. In the first trial cooking the alkali is injected at 130° C. and the temperature is raised quickly to 150° C. and the cooking is finished at that temperature. The pH of the alkali solution is about 8–8.5. The pulp is evaluated in the laboratory or made into paper in the paper mill. A record is made of the results.
5. In the second trial injection takes place as indicated and the temperature is raised to 155° C., the other factors being the same as hereinbefore. The pulp is again evaluated. A record is made of the pulp evaluation and of the mill run.
6. In the third trial, the injection takes place at 135° C. and the maximum temperature of 150° C. The other factors are the same as heretofore. Pulp is again evaluated and a record is made.

In this manner, the best temperature curve and injection temperature for this type pulp is determined to be 140° C. and the maximum temperature is about 155° C. The temperature curves for all the types of pulp can be worked out by following this procedure.

When a strong white and easily bleached pulp is wanted, then the temperature is raised to about 110° C. in about three hours and from that point the temperature is raised to 140° C. in two hours. In the meantime, the pressure has risen to atmospheres corresponding to about 7 kg. per sq. cm. in about four hours. In order to maintain this pressure, excess gases from the digester are relieved first into the acid tanks and after that, if bi-sulfite liquor is to be made, into the bi-sulfite tanks. The pressure is kept at 7 kg. per sq. cm. until the alkali injection time comes. The total $SO_2$ content of the cooking liquor drops as shown in the chart illustrated in Fig. 4. When this occurs, the following phenomena has taken place.

At the early stage of the cooking, the acid group of bi-sulfite was introduced into lignin molecule. When the cooking temperature was raised, hydrolysis of lignin began. Ligno-sulfonic acid was formed and being stronger acid than sulfurous acid of the cooking liquor, it reacted with the sodium base forming sodium salt of the ligno-sulfonic acid. At the same time, less resistant hemi-celluloses were hydrolyzed to simpler compounds soluble in the cooking liquor. This takes place until the injection point. A partly digested pulp was produced. The hydrolysis of lignin and the formation of ligno-sulfonic acid takes place until the cooking is finished.

Even alpha cellulose is not absolutely resistant so that hydrolysis will also break it down chemically and physically and will partly decompose it into soluble products. Therefore, a pulp produced by the conventional sulfite process has not the strength characteristics of a sulfate pulp or of a pulp produced by my process.

The cellulose in the conventional sulfite fibre is partly broken down. In my process this is prevented by the injection of alkali into the digester, for instance, at 140° C.

On the other hand, when making high alpha pulp full use is made of hydrolysis of the ligno-sulfonic acid. The hydrolysis is carried until very little lignin is left in the wood while at the same time more resistant hemi-celluloses is made soluble in alkali.

After completing the acid phase, alkali is injected into the digester which neutralizes the ligno-sulfonic acid and which dissolves hemi-celluloses and non-cellulosic material. By continuing the cooking in alkali, the digesting of the pulp is completed.

The alkali injection in this example is selected to take place at 140° C. Before the injection, the gases are relieved until there is practically no free $SO_2$ left in the digester. By doing so, the chemical load of the digester is reduced, as otherwise in the injection the remaining $SO_2$ would react with the alkali liquor forming monosulfite, which is not needed in the alkali cooking phase. The relieved $SO_2$ is used to make either bi-sulfite or to strengthen the cooking acid in the acid tank. When the $SO_2$ is relieved, the pressure drops to the low point as shown in the chart (see Fig. 4).

After relieving the digester, the total $SO_2$ content of the cooking liquor is about 0.2–0.3% and the pH-value of the liquor is about 2. By determining the pH of the cooking liquor at the alkali injection time, a pre-calculated and proper amount of alkali can be pumped into the digester to bring the pH to a value of about 8.5. The injection pump gets its alkali from the alkali storage tank in the alkali system. The pump can be any appropriate type, such as a centrifugal or plunger type or, in fact, any suitable device capable of injecting the alkali into the digester. Any appropriate alkali can be used for this purpose, such as recovered alkali of the recovery system which contains some sodium sulfide, soda ash, sodium bicarbonate, sodium sulfate, etc. In the event that additional alkaline reagents are to be employed, it has been found that sodium hydroxide, sodium carbonate and sodium bi-carbonate gives satisfactory results.

After the alkali injection, the temperature is raised quickly to 160° C. and is kept at this temperature for about three hours. The pressure in the digester raises to the corresponding pressure of saturated steam or a little higher. Before the digester is blown into a blow tank or pit, the excess pressure is relieved through a cooler into a hot water tank. When the pressure has dropped to about 2–2.5 kg. per sq. cm., the digester is blown. The pulps made in this manner have properties described hereinafter.

EXAMPLE NO. 2

Spruce wood chips will be subject to the new combination acid-alkali process to produce a highly purified pulp having a high alpha content of say 96% or higher. The wood chips are first treated with acid liquor and then with the alkali liquor. The time and temperature schedule for this type of a pulp is worked out by making a few test cooks and then testing the pulp chemically and mechanically as described more fully hereinbefore. It is found that after allowing about three hours for the penetration time, the temperature can be raised quickly to about 150° C. It is then maintained at this temperature for about two hours whereby the hydrolyzing effect of the ligno-sulfonic acid is severe enough so that a pulp having an alpha content of 96–98% is produced. As illustrated in the chart, the pH-value of the cooking liquor drops to about 1.0 and remains at this value for at least one hour. This is a very important factor in making high alpha pulp.

Before the alkali injection, the digester is relieved of free $SO_2$. If a very pure pulp is wanted, enough alkali is injected to raise the pH-value of the cook liquor to about 9.5 and kept at this value for the rest of the cooking time. After the alkali injection, the temperature is raised to about 170° C. and the cooking is finished at that temperature. The pressure within the digester raises to a point corresponding the pressure of the saturated steam at that temperature or a little higher. When the cooking is finished, the digester is blown in the usual way. The pulp produced has properties which are described hereinafter.

EXAMPLE NO. 3

In the event that Douglas fir or another resinous wood is to be treated by the present invention, it is preferred to use a chip length of about ⅝", an increased acid strength so that the total $SO_2$ is about 9.0 to 10.0% and the combined $SO_2$ is 1.5%, and the penetration time is about one-half of an hour longer. For the purpose of obtaining the best possible pulp, a few trial cookings are run to determine the best temperature, injection time and pH value as explained more fully hereinabove. By first subjecting the wood chips to a treatment in acid liquor and then in alkali liquor as described hereinbefore, a high grade pulp can be made.

As shown in the foregoing examples, the pH value of the cooking liquor, as determined at ordinary temperature, plays a very important role in the new process. It gives a pulp maker, a tool for the control of the process which he lacked when making pulps by the conventional sulfite and alkali processes. In those conventional processes, the pH-value is of no avail because it is impossible to do anything about it. In the present process, the pH value of the acid phase can be changed by the injection of alkali at will. By doing so, the character of the pulp can be changed. As shown, the pH value of the liquor or, in other words, the hydrolyzing effect of the ligno-sulfonic acids in the fibres, can be controlled which is not the case in the conventional sulfite process. In the alkali phase of the new process, the ligno-sulfonic acid is neutralized and its salts, dissolved. The non-cellulose material is likewise dissolved and higher purified fibres are produced. The higher the pH value of the liquor is raised, the more purified fibres can be obtained. I have found that pH-limits are 7 to about 10.5. It is preferred not to go any higher in pH-value than necessary, as it means that the higher the pH, the higher is the amount of chemicals used for cooking. It is desired to keep the lowest possible pH, which means the most economical pH. There is also danger of getting a dark pulp, if a higher pH than 10.5 is used due to the fact that the precipitation of the polymerized lignin in the cooking liquor takes place.

Now when the digester can be made to stand higher pressure, I prefer a digester capable of withstanding a pressure of about 10 kg. per sq. cm. Of course, a digester with lower pressure can be used. The maximum temperatures used depends on the digester, and on the pulp to be produced. It is preferred not to cook with a higher temperature than 180° C.

To illustrate some differences between the pulps made by the conventional sulfite and sulfate processes and pulps made by my new process and to compare my higher alpha pulp with cotton linters, the following schedules are given:

|  | Unbleached Sulfite Pulp | Unbleached Sulfate Pulp | My Unbleached Pulp |
|---|---|---|---|
| Alpha Cellulose _____ percent __ | 88.5 | 91.5 | 92.5 |
| Pentosans _____ do ____ | 5.3 | 9.0 | 4.0 |
| Viscosity _____ centipoise __ | 110 | 100 | 230 |
| Ash _____ percent __ | 0.5 | 0.8 | 0.2 |
| Roe-number _____ | 5.0 | 5.5 | 4.9 |
| Ether extract _____ percent __ | 1.0 | 0.1 | 0.2 |

|  | My Unbleached High Alpha Pulp | Unbleached Cotton Linters |
|---|---|---|
| Alpha content _____ percent __ | 97.5 | 96–99 |
| Pentosans _____ | 1.3 | 0.7–1.2 |
| Viscosity _____ | 200 | 200 |
| Ash _____ | 0.2 | 0.11–1.3 |
| Ether extract _____ | 0.15 | 0.12–1.1 |
| Roe-number _____ | 1.0 |  |

Compared with my pulp, the conventional sulfite and sulfate pulps show:

(1) Lower alpha content
(2) Higher pentosans content
(3) Higher ash content
(4) Higher ether extract in sulfite pulp
(5) Lower viscosity in both In comparison of my alpha pulp with cotton linters, my pulp has very similar characteristics to the cotton linters. It also stains more like the cotton linters. It can be used as a substitute for the cotton linters in making cellulose derivatives.

For the purpose of showing the superior properties of pulp made by the present combination acid-alkali injection alkali process over conventional sulfite pulp and sulfate pulp, comparative figures are set forth in Table I. All of these pulps were made from spruce wood.

Table I

| Property | Sulfite Pulp | Sulfate Pulp | New Combination Acid-Alkali Pulp |
|---|---|---|---|
| Freeness, ° S R | 50 | 50 | 50 |
| Beating Time, Min | 55 | 95 | 80 |
| Breaking Length, M | 8,400 | 9,000 | 9,500 |
| Burst factor | 62 | 77 | 83 |
| Tear factor | 1.60 | 2.35 | 2.40 |
| Fold Schopper | 4,300 | 6,300 | 9,500 |
| Roe Number | 6.3 | 5.9 | 4.9 |

It is to be noted that the new pulp is particularly superior in comparison with conventional sulfite pulp with respect to breaking length, burst factor, fold and tear factor.

It is to be observed that an important feature of the present invention is the injection of alkali into the digester at the end of the first phase of acid cooking when the pulp is partially and incompletely digested. This feature makes the use of sodium as a base for bi-sulfite cooking liquor possible and practical. As well known, the use of sodium as a base of a bi-sulfite liquor has heretofore been impossible for commercial operations on an industrial scale because of its high cost and because no recovery system was heretofore available. In contrast with the prior art, my process provides a recovery system and the chemicals recovered can be used in the operations. Sodium sulfide which is formed in the recovery boiler and which has hindered the use of sodium in the sulfite process can be used in my process using some kind of a treatment, converting it to sodium bi-carbonate and hydrogen sulfide. Even sodium sulfide can be injected into the digester in my process with the sodium salts used for injection without detrimental effects. The reason is that no free sulfur is formed in the cooking liquor after the injection is alkali.

Moreover, it is to be noted that the acid phase of my process for cooking different types of pulp is much shorter than the conventional sulfite cooking. Generally stated, it is about one hour to about four hours shorter. The hydrolysis of ligno-sulfonic acid is shorter. Accordingly, when making strong pulp, the effect of the ligno-sulfonic acid is short and does not have a damaging action as in the sulfite process in which the damaging action continues until the cooking is finished.

Furthermore, it is to be observed that the present invention provides a three-phase acid-alkali cooking process involving alkali injection for the production of pulp from cellulose fibrous materials involving cooking in a first phase cellulose fibrous material in acid cooking liquor containing an alkali bisulfite and free $SO_2$, continuing said cooking until said fibrous material is partially cooked, injecting in a second phase alkali liquor into said acid cooking liquor to convert the same into an alkali cooking liquor, completing in a third phase the cooking of said partially cooked cellulose fibrous material in said alkali cooking liquor to produce an improved pulp, separating said pulp from said liquor, evaporating said liquor to concentrate the same, burning the concentrated liquor to produce an alkali smelt, dissolving said smelt to produce alkali liquor, blowing $CO_2$ through said alkali liquor to produce alkali bicarbonate, returning a portion of said alkali liquor containing alkali bicarbonate for treatment with $SO_2$ to produce acid bisulfite liquor for use in the first phase of acid cooking and to liberate $CO_2$ for use in producing alkali bicarbonate in alkali liquor for use in the second phase of alkali injection and in the third phase of alkali cooking, whereby cyclic operations are provided for the recovery of heat capable of being used in the cooking and other phases, and of chemicals capable of being used as the base for cooking liquor for the first, second, and third phases, and using another portion of said alkali liquor containing alkali bicarbonate in the second phase of alkali injection and in the third phase of alkali cooking.

The present invention also contemplates the provision of a three-phase acid-alkali cooking process involving alkali injection for the production of pulp from cellulose fibrous materials in which an ammonium salt, such as ammonium bisulfite, is used as the base for the acid cooking liquor and an ammonium salt, such as ammonium bicarbonate is used as the base for the alkali cooking liquor. In such a process, alkali liquor using sodium or potassium as the base is injected into the cooking liquor to liberate ammonia which can be recovered. When it is desired to use ammonium agents as the alkali for injection, ammonia gas or ammonia water can be injected into the cooking liquor. To recover ammonia, alkali is added to the ammonium cooking liquor after evaporation but before burning. In case it is desired to make fertilizer as a by-product, air is injected or blown into the liquor before evaporation to convert sulfur compounds into sulfates and then the thus-treated liquor is evaporated to dryness to produce an ammonium residue capable of being used as a fertilizer.

Although the present invention has been described in conjunction with certain preferred embodiments, it is to be understood that modifications and variations may be resorted to without departing from the spirit and scope of the invention, as those skilled in the art will readily understand. Such variations and modifications are to be considered within the purview of the application and the scope of the appended claims.

I claim:

1. An improved three-phase manufacturing process for the production of pulp from cellulosic fibrous material which comprises making chips of cellulosic fibrous material, digesting as a first phase said chips in a digester in a weak acid cooking liquor consisting essentially of a bisulfite of the group consisting of sodium, potassium and ammonium and containing an excess of sulfur dioxide, the said weak acid liquor having a total sulfur dioxide content of about 5% to about 10%, a combined $SO_2$ content of about 0.5% to about 1.5%, and a free $SO_2$ content of about 4.25% to about 8.5%, maintaining a digesting pressure within said digester of about 75 to about 150 pounds per square inch, continuing the weak acid digesting for about 3 hours while raising the temperature to about 100° C. to produce partly digested pulp and to reduce the sulfur dioxide content to less than about 1%, increasing the temperature to within a range of about 100° C. to about 155° C., injecting as a second phase alkali liquor into said cooking liquor within about 3 to about 7 hours from the start of the said first phase digesting operation, the composition of the said alkali liquor containing about 10% to about 60% $NaHCO_3$, about 60% to about 25% $Na_2CO_3$, about 10% to about 2% $Na_2S$ and about 10% to about 3% $Na_2SO_4$, completing the injecting of said alkali liquor within about ⅛ to about ½ hour while changing the pH from a value within a range of about 0.75 to about 3 to a value within a range of about 7.0 to about 10.5 to produce a weak alkaline cooking liquor and completing the digesting of the partly digested fibrous material as a third phase in said weak alkaline liquor within a period of about 2½ hours to about 5 hours at a temperature within a range of about 150° C. to about 180° C.

2. The improved process set forth in claim 1 in which the temperature at the end of the acid digesting is about 130° C., the pH after the injection of alkali liquor is about 8 to about 8.5, and the temperature is raised quickly during the weak alkaline digesting to about 150° C. to about 155° C. and is maintained thereabout until the digesting is completed whereby quick hydrating pulp having a high bursting strength is produced.

3. The improved process set forth in claim 1 in which the temperature at the end of the acid digestion is about 140° C. whereby a slow hydrating pulp having high tearing is produced.

4. The improved process set forth in claim 1 in which the weak acid cooking liquor is constituted mainly of bisulfite of ammonium liquor and in which alkali liquor is injected into the cooking liquor at the end of the acid digesting stage to render the same alkaline and to set the ammonia free so that it escapes and can be recovered and re-used for making ammonium bisulfite cooking liquor for use herein as a cyclic operation.

5. A three-phase manufacturing process especially adapted for the production of strong pulp from cellulosic fibrous material which comprises as the first phase digesting chips of cellulosic fibrous material in a digester under pressure for a period of several hours up to about 5 hours in a weak acid cooking liquor having a pH value of about 1 to about 2.0 and consisting of a weak acid salt solution consisting essentially of a bisulfite of soda and sulfur dioxide while raising the temperature first to about 110° C. and then to about 140° C., controlling the pH value of the weak acid cooking liquor within a range of about 1.3 to about 3.0, relieving gases including $SO_2$ from the digester, as a second phase injecting during a short, intermediate conversion period of less than about one hour alkaline liquor consisting essentially of a carbonate of soda into said weak acid cooking liquor without separating the pulp and without discontinuing the cooking in said digester to neutralize ligno-sulfonic acid and to convert said weak acid liquor into a weak alkaline cooking liquor having a pH within a range of about 8 to about 9 and consisting essentially of a carbonate of soda, and as a third phase completing the alkaline digesting in the aforesaid digester of said partially digested pulp in said weak alkaline cooking liquor consisting essentially of a carbonate of soda while heating at the temperature within a range of more than about 150° C. but less than about 180° C. for a period of several hours up to about 4 hours thereby producing a strong pulp.

6. An improved three-phase manufacturing process especially adapted for the production of high alpha pulp from cellulosic fibrous material which comprises as the first phase digesting chips of cellulosic fibrous material in a digester under pressure for a period of several hours up to about 7 hours at a temperature starting at about 70° C. and increasing to about 150° C. to about 155° C. in a weak acid cooking liquor having a pH value of about 0.75 to about 3 and consisting of a weak acid salt solution consisting essentially of a bisulfite of soda and sulfur dioxide, as a second phase injecting during a short intermediate conversion period of less than about one hour alkaline liquor containing essentially a carbonate of soda into said weak acid cooking liquor without separating the pulp and without discontinuing the cooking in said digester to neutralize ligno-sulfonic acid and to convert said weak acid liquor into a weak alkaline cooking liquor having a pH value of about 9 to about 10 and consisting essentially of a carbonate of soda, and as a third phase completing the alkaline digesting in the aforesaid digester of said partially digested pulp in said weak alkaline cooking liquor consisting essentially of a carbonate of soda while heating at a temperature within a range of about 165° C. to about 180° C. for a period of about several hours up to about 3 hours thereby producing high alpha pulp having a high purity and an alpha content of at least about 96% as compared with conventional pulp having a low purity and a low alpha content of the order of about 88% to 91%.

7. An improved three-phase manufacturing process for the production of pulp from cellulosic fibrous material which comprises making chips from said cellulosic fibrous material, digesting as a first phase said chips in a digester under pressure in a weak acid cooking liquor having a pH of about 0.75 to about 2.25 and consisting of a weak solution consisting essentially of a bisulfite of an alkali metal and sulfur dioxide, said weak acid liquor containing an excess of sulfur dioxide, having a total $SO_2$ content of about 5% to about 10%, a combined $SO_2$ content of about 0.5% to about 1.5% and a free $SO_2$ content of several percent and said weak acid cooking liquor being substantially free from calcium and magnesium, increasing the temperature of said weak acid cooking liquor to within a range of about 100° C. to about 150° C. during the weak acid digesting stage in the aforesaid digester in a period of at least about 2½ hours and not more than 7 hours to produce a partly digested pulp, relieving sulfur dioxide content to less than about 1%, injecting as a second phase weak alkaline liquor consisting essentially of a carbonate of an alkali metal into said cooking liquor in the aforesaid digester to convert it from weak acid to a weak alkaline liquor and to change the pH measured at room temperature from within a range of about 0.7 to about 3 to a pH higher than about 7 and not more than about 10.5 without separating said partly digested pulp and without discontinuing the digesting in said digester while maintaining said temperature up to about 150° C., the converted weak alkaline cooking liquor having a pH within a range of higher than about 7 and not more than about 10.5 and containing bicarbonate, carbonate, and sulfide of an alkali metal, and completing as a third phase the digesting in said weak alkaline liquor substantially devoid of caustic alkali within a period of about 2 to about 5 hours at a temperature of about 150° C. to about 180° C. in the same digester to produce an improved pulp.

8. A three-phase manufacturing process for the production of improved pulp from cellulosic fibrous material which comprises as the first phase digesting chips of cellulosic fibrous material in a digester under pressure in a weak acid cooking liquor consisting of a weak acid salt solution consisting essentially of a bisulfite of soda and sulfur dioxide, said weak acid cooking liquor having a pH within a range of about 0.7 to about 3.0 during the acid digesting, continuing said acid digesting for several hours up to about 5 hours at a temperature of at least about 100° C. up to about 150° C. in said weak acid cooking liquor to introduce an acid group into lignin carbohydrate complexes capable of being hydrolyzed into ligno-sulfonic acids and carbohydrates while at the same time hemi-celluloses are hydrolyzed thereby producing a partly digested pulp delignified to such an extent that it can be easily defibrated, as a second phase injecting alkaline liquor consisting essentially of a carbonate of soda into said weak acid cooking liquor without separating the pulp and without discontinuing the digesting in said digester to convert said weak acid liquor into a weak alkaline cooking liquor consisting essentially of a carbonate of soda and having a pH within a range of more than about 7 to about 10.5, and as a third phase completing the digesting for several hours at a temperature of about 150° C. to about 180° C. in the aforesaid digester of said partly digested pulp in said weak alkaline cooking liquor consisting essentially of a carbonate of soda thereby producing an improved pulp.

9. A three-phase manufacturing process for the production of improved pulp from cellulosic fibrous material which comprises as the first phase digesting chips of cellulosic fibrous material in a digester under pressure in weak acid cooking liquor consisting of a weak acid salt solution consisting essentially of a bisulfite of an alkali metal and sulfur dioxide, said weak acid cooking liquor having a pH within a range of about 0.7 to about 3.0 during the acid digesting and being substantially free from calcium and magnesium, continuing said acid digesting for several hours up to about 5 hours at a temperature of about 70° C. up to about 155° C. in said weak acid cooking liquor to produce a partly digested pulp delignified to such an extent that it can be easily defibrated, relieving gases including sulfur dioxide from said digester, as a second phase injecting alkaline liquor consisting essentially of a carbonate of an alkali metal into said weak acid cooking liquor without separating the pulp and without discontinuing the digesting in said digester to neutralize ligno-sulfonic acid and to convert said weak acid liquor into a weak alkaline cooking liquor consisting essentially of a carbonate of an alkali metal and having a pH within a range of more than about 7 to less than about 10.5, said weak alkaline liquor being substantially free from caustic alkali, and as a third phase completing the digesting of said partly digested pulp for several hours at a temperature of about 120° C. to about 180° C. in said weak alkaline cooking liquor consisting essentially of a carbonate of an alkali metal thereby producing an improved pulp.

References Cited in the file of this patent

UNITED STATES PATENTS

| Number | Name | Date |
|---|---|---|
| 1,310,694 | Edwardes | July 22, 1919 |
| 1,605,927 | Drewsen | Nov. 9, 1926 |
| 1,699,808 | Pinnan | Jan. 22, 1929 |
| 1,787,953 | Richter | Jan. 6, 1931 |
| 1,787,954 | Richter | Jan. 6, 1931 |
| 1,860,848 | Bradley et al. | May 31, 1932 |
| 1,934,655 | Bradley | Nov. 7, 1933 |
| 2,238,456 | Tomlinson | Apr. 15, 1941 |

FOREIGN PATENTS

| 43,716 | Norway | Feb. 14, 1927 |
|---|---|---|

OTHER REFERENCES

Manufacture of Pulp and Paper, pub. by McGraw-Hill, New York, 3rd ed., vol. III, sec. 4, page 4, and sec. 5, page 5 (1937).

Chidester et al., Paper Trade Journal, February 9, 1939, page 31.

Canada Department of Mines and Resources, Dominion Forest Service Bulletin 97, pages 33 and 34 (1942).

Chemistry of Pulp and Paper Making by Sutermeister, 3rd ed., page 261 (1941), published by John Wiley, New York.

Manufacture of Pulp and Paper, 3rd ed., vol. III, sec. 4, page 89 (1937), published by McGraw-Hill, New York.